United States Patent [19]

Briand et al.

[11] 4,191,969

[45] Mar. 4, 1980

[54] VIDEO COMPOSITE TRANSMISSION SYSTEM INTEGRATING ENCODED DATA CHANNELS INTO BLANKING AND SYNCHRONIZING SIGNAL

[76] Inventors: Marcel E. Briand, 67, rue de la Fougeraie Levis-St-Nom, Le Mesnil St Denis, France, 78320; Georges A. Pannetier, 12, rue de l'Amiral Roussin, Paris, France, 75015

[21] Appl. No.: 890,497

[22] Filed: Mar. 27, 1978

[30] Foreign Application Priority Data

Apr. 29, 1977 [FR] France ................................ 77 12990

[51] Int. Cl.[2] ................................................ H04N 7/08

[52] U.S. Cl. ........................................ 358/145; 358/85

[58] Field of Search ................. 358/85, 142, 143, 144, 358/145

[56] References Cited

U.S. PATENT DOCUMENTS

| | | | |
|---|---|---|---|
| 3,676,862 | 7/1972 | Sasabe | 358/145 |
| 3,723,637 | 3/1973 | Fujio | 358/145 |
| 3,819,852 | 6/1974 | Wolf | 358/145 |
| 4,005,265 | 1/1977 | Verhoeckx | 358/145 |

*Primary Examiner*—Howard W. Britton

*Attorney, Agent, or Firm*—Abraham A. Saffitz

[57] ABSTRACT

A video composite transmission system connecting a camera and a picture receiver of a picture transmitting device and a plurality of data terminals to a video switching network via an analog two path line transmitting an analog video composite signal. In the transmission part, it comprises means for shortening pulses of blanking and synchronizing the signal transmitted from the camera and thereby obtaining a blanking and synchronizing signal, in elongated back blanking porches of which are integrated and companded first digital multiplex data channels transmitted from first data terminals. Second digital multiplex data channels are also integrated and companded into the trace interval of each available black line of vertical blanking and synchronizing signal transmitted from camera. The first and second digital multiplex companded data channels are mixed and converted in a multilevel code, and the multilevel coded channel is analogically mixed with the shortened blanking and synchronizing signal and the whole of video signal to obtain said analog video composite signal. The receiving part of the system enables each initial digital data channel and the initial blanking and synchronizing signal to be reconstituted in response to the analog composite video signal transmitted from video switching network.

4 Claims, 8 Drawing Figures

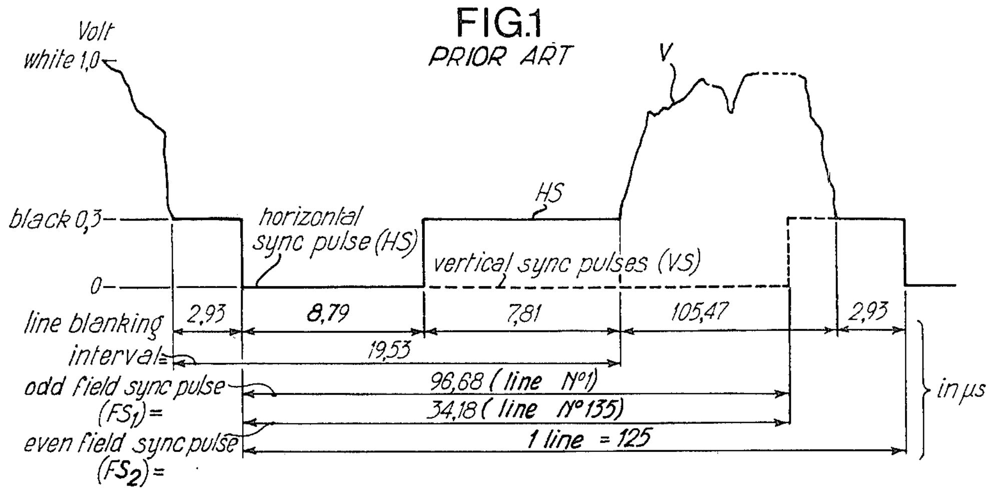
FIG.1
PRIOR ART
Volt
white 1,0
black 0,3
0
V
HS
horizontal sync pulse (HS)
vertical sync pulses (VS)
line blanking interval
odd field sync pulse (FS1)
even field sync pulse (FS2)
2,93
8,79
7,81
105,47
2,93
19,53
96,68 (line N°1)
34,18 (line N°135)
1 line = 125
in µs

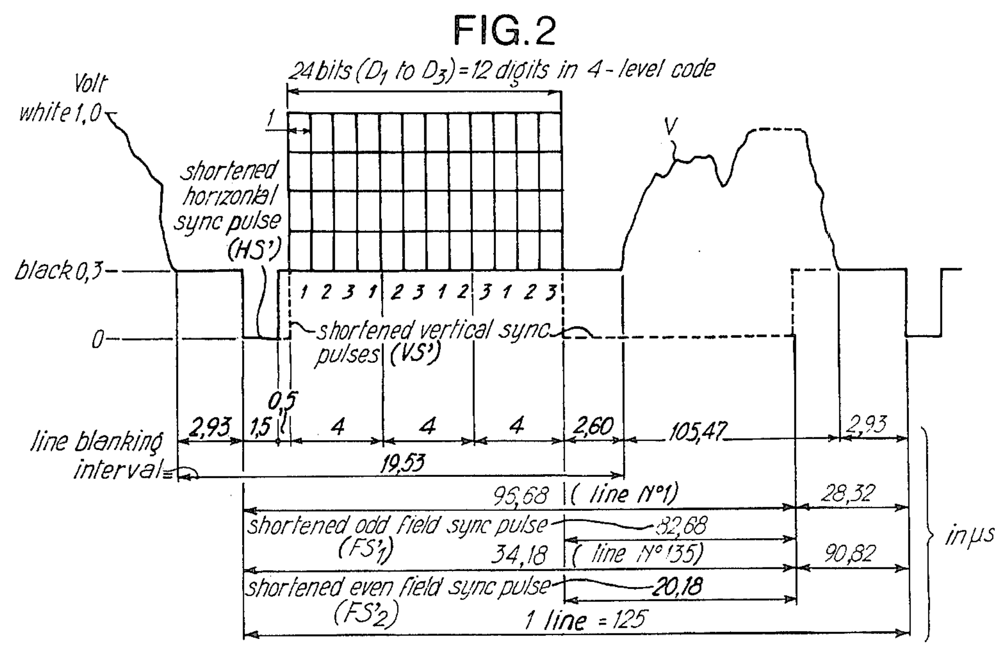
FIG.2
24 bits (D1 to D3) = 12 digits in 4-level code
Volt
white 1,0
black 0,3
0
V
shortened horizontal sync pulse (HS')
1 2 3 1 2 3 1 2 3 1 2 3
shortened vertical sync pulses (VS')
line blanking interval
2,93
1,5
0,5
4
4
4
2,60
105,47
2,93
19,53
96,68 (line N°1)
28,32
shortened odd field sync pulse (FS'1)
82,68
34,18 (line N°135)
90,82
shortened even field sync pulse (FS'2)
20,18
1 line = 125
in µs

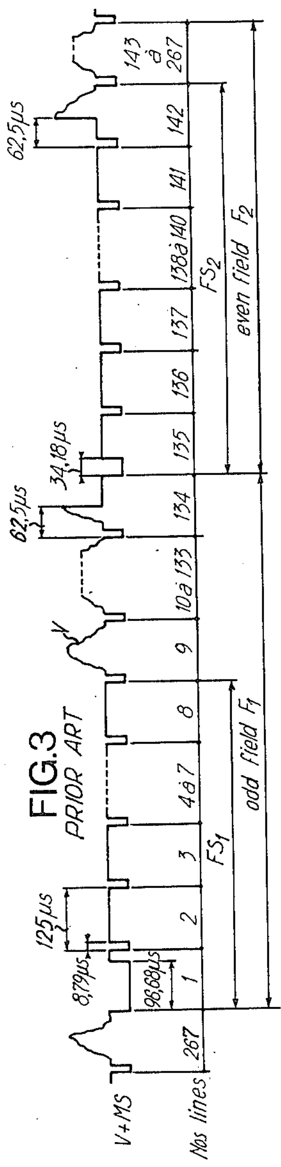
FIG.3
PRIOR ART
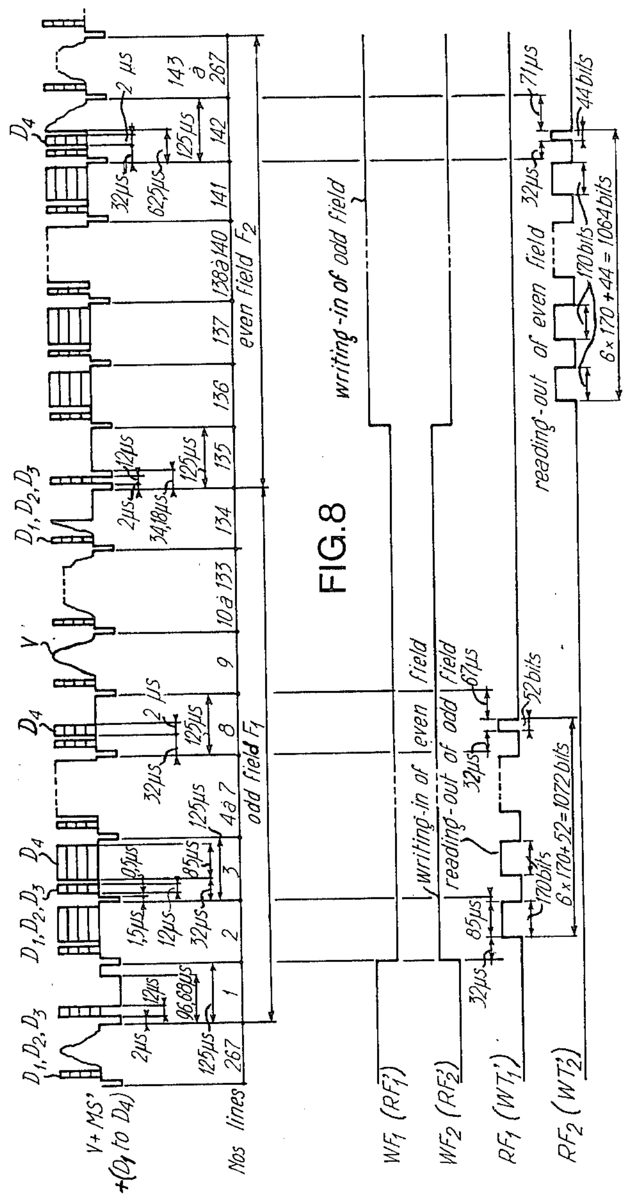
FIG.4
FIG.8

VIDEO TELEPHONE SET
PICTURE RECEIVER
CAMERA
TRANSMISSION
RECEIVING
AUTO-SWITCH
TERMINAL (SOUND) D1
TERMINAL D2
TERMINAL D3
TERMINAL D4
V+MS
V+MS'+(D1 to D4)
two video telephone wire pairs
8,192MHz
64kHz
digital channels
LT
LR

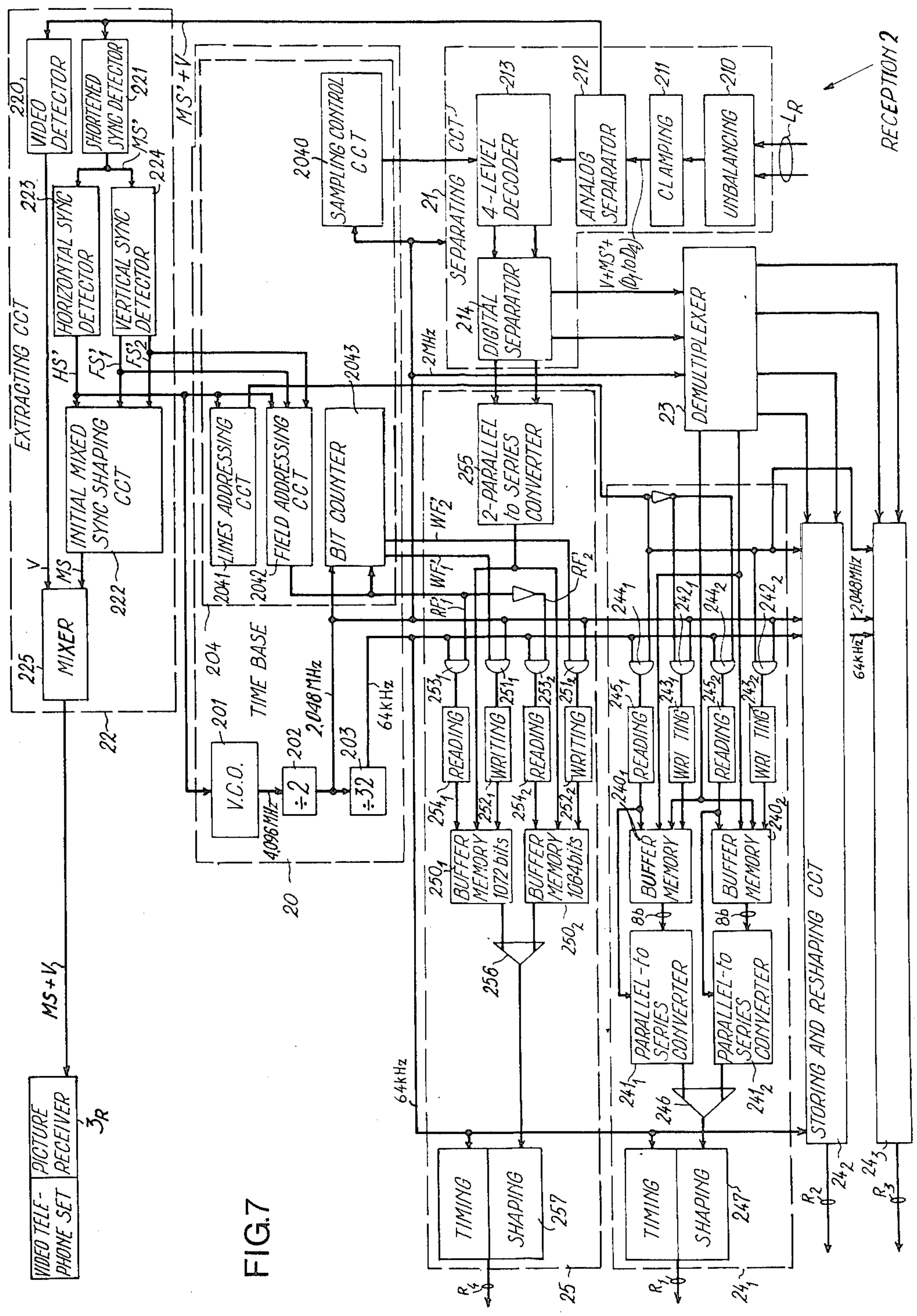
FIG.7
RECEPTION 2
UNBALANCING
CLAMPING
ANALOG SEPARATOR
4-LEVEL DECODER
SEPARATING CCT
DIGITAL SEPARATOR
DEMULTIPLEXER
SAMPLING CONTROL CCT
VIDEO DETECTOR
SHORTENED SYNC DETECTOR
HORIZONTAL SYNC DETECTOR
VERTICAL SYNC DETECTOR
EXTRACTING CCT
INITIAL MIXED SYNC SHAPING CCT
MIXER
LINES ADDRESSING CCT
FIELD ADDRESSING CCT
BIT COUNTER
TIME BASE
V.C.O.
÷2
÷32
4,096 MHz
2,048 MHz
64 kHz
2 MHz
2-PARALLEL to SERIES CONVERTER
READING
WRITING
BUFFER MEMORY 1072 bits
BUFFER MEMORY 1064 bits
BUFFER MEMORY
PARALLEL-to SERIES CONVERTER
STORING AND RESHAPING CCT
TIMING
SHAPING
VIDEO TELE-PHONE SET
PICTURE RECEIVER
MS+V
MS'+V

VIDEO COMPOSITE TRANSMISSION SYSTEM INTEGRATING ENCODED DATA CHANNELS INTO BLANKING AND SYNCHRONIZING SIGNAL

CROSS REFERENCES TO RELATED APPLICATIONS

Applicants hereby make cross references to their French patent application No. PV 77-12990, filed Apr. 29, 1977 and claim priority thereunder following the provisions of 35 U.S.C. 119.

BACKGROUND OF THE INVENTION

1. Field of the Invention

The present invention relates to a video composite transmission system connecting a camera and a picture receiver of a picture transmitting device and a plurality of data terminals to a video switching network via an analog two-path line transmitting an analog video composite signal.

More particularly, the invention relates to a system of this kind in which, at the transmission end, multiplexed digital data channels are solely integrated during the horizontal blanking intervals and are companded into a suitable line code, the horizontal synchronizing pulses are shortened to widths suitable to their detection and to the integration of said digital data channels, and the shortened synchronizing pulses, said multiplexed and encoded digital data signals and the analog video signal are mixed and transmitted in analog waveform, and in which, at the receiving end, reverse procedures of those carried out at the transmission end are carried out for the purpose of obtaining the initial digital data channels, analog video signal, and initial analog horizontal synchronizing pulses. Generally, the digital data channels are suitably sampled sound signals.

2. Description of the Prior Art

The principle of operation of a composite transmission system of this kind is described in the article by E. ADLER, H. HÄBERLE and G. STEUDEL, which appeared in the review ELECTRICAL COMMUNICATION, Volume 49, No. 3, 1974, pages 332 to 335. In this article, the binary pulses of the digital data channels are companded by transcoding to ternary code, which limits the amount of information which can be transmitted during each horizontal blanking interval.

Also known are video composite transmission systems in which digital data signals are companded either in each line blanking interval or in a part of the trace or scanning interval of each line normally occupied by the analog video signal.

A video composite transmission system of this kind in which the video signal is totally transmitted in analog waveform is, for example, described in U.S. Pat. No. 4,005,265. In this patent the synchronizing signals are digitalized on the basis of a predetermined code in which the line and field synchronizing information is not only inserted in the blanking intervals of all the lines but also in the trace intervals of the lines assigned to the frame blanking interval.

Other composite transmission systems in which the video signal is "partially" transmitted in analog waveform are for example described in French Pat. No. 2 216 741 of Jan. 31, 1973 and in German patent application DT-OS No. 2 453 441.6-35 of Nov. 12, 1974. In systems of this kind the video signal is either transmitted in analog fashion and partially, the other part of the trace interval of each line being occupied by the digital data channels, or in the waveform encoded in $2^M$ quantized levels, as well as the synchronizing signals and the digital data channels occupying part of the line blanking intervals.

In all the above-indicated examples of transmission systems it appears that the information amount, that is to say the digital data rate transmitted per frame or per field, is limited either by the use of the code selected for the digital data signals with a view to transmission of the latter, or by the characteristic integration position of the digital channels, which in particular contributes towards the partial transmission of the video signal which, at the receiving end, results in a lack of precision of the retransmitted picture as e.g. spacious contours in the picture due to large level quantization of the video signal.

Thus, in the case of a video telephone transmission system which will be referred to hereinafter, it is necessary to transmit additional digital data channels other than those usually transmitted, viz sound signals. These other channels are, for example:

- telecopying channels at a rate of 64 kbits/s;
- rapid telecopying channels at a rate of 128 kbits/s;
- signalling channels at a rate of 64 kbits/s;
- generally speaking, data channels transmitted in digital form at a rate of 64 and 128 kbits/s;
- or any other combination of digital channels at 64 and 128 kbits/s.

OBJECTS OF THE INVENTION

The main object of the present invention is to provide a video composite transmission system of analog voice and synchronizing signals mixed with suitably-coded digital data channels, other than sound signals, in which multiplexed data channels are transmitted and mixed with the preceding analog signals without reducing the video signal transmitted integrally in analog waveform, the pulses of the synchronizing signals being shortened without the synchronization being thereby lost at the receiving end.

A further object of this invention is to provide a composite transmission system in which digital data channels are integrated in the trace intervals of the black lines which are available and allocated to field blanking or vertical blanking.

Finally, a further object of this invention is to provide a composite transmission system in which all the digital data channels are transmitted in the form of a $2^M$ level code, and the synchronizing pulses are shortened but transmitted in analog waveform so as to easily detect the horizontal and vertical scanning synchronization at the reception end without it being necessary to have recourse to complex transcoding equipments.

SUMMARY OF THE INVENTION

In accordance with the aforementioned objects, a video composite transmission system comprises:

- means for shortening synchronizing pulses of first analog synchronizing signals transmitting from said camera, and thereby obtaining, second analog shortened synchronizing signals having back blanking porches greater than those of said first synchronizing signals;
- means for integrating and companding each of first digital data channels transmitting from first data terminals solely into the back blanking porches of each recurrent line of said second shortened synchronizing signals;

means for extracting and reshaping said first digital data channels in response to said first digital companded data channels included in said second shortened synchronizing signals transmitted from said video switching network;

means for multiplexing and demultiplexing said first digital companded data channels into a first digital multiplex data channel;

means for reshaping said first analog synchronizing signals transmitted to said picture receiver in response to said shortened synchronizing pulses of said second analog synchronizing signals transmitted from said video switching network;

means for integrating and companding each of said second digital data channels transmitting from second data terminals solely into the trace interval of each available black line of vertical blanking and synchronization signal transmitted from said camera;

means for multiplexing and demultiplexing said second digital companded data channels into a second digital multiplex data channel;

means for digitally mixing said first and second digital multiplex data channels and thereby obtaining a digital mixed data channel;

means for converting said digital mixed data channel from binary code used in said data terminals into a mixed analog data channel in a $2^M$-level code, M being an integer greater than or equal to 2;

means for analogically mixing said analog mixed data channel, said second analog shortened synchronizing signals and said video signal transmitted from said camera, and thereby obtaining said analog video composite signal transmitted to said video switching network;

means for analogically separating said analog mixed data channel, said second analog shortened synchronizing signals and said video signal in response to said analog video composite signal transmitted from said video switching network;

means for converting said analog mixed data channel in said $2^M$-level code into said digital mixed data channel in binary code;

means for digitally separating said first and second digital multiplex data channels in response to said digital mixed data channel; and means for extracting and reshaping said second digital data channels in response to said second digital companded data channels issued from said demultiplexing means of said second digital multiplex data channel.

BRIEF DESCRIPTION OF THE DRAWING

The foregoing and other objects, features and advantages of the invention will be apparent from the following more particular description of the preferred embodiment of the invention as illustrated in accompanying drawings, in which:

FIG. 1 represents an analog video telephone signal which is of known type and which is sent by a videotelephone during a line interval;

FIG. 2 illustrates an analog videotelephone signal delivered by the transmission part of a video composite transmission system embodying the invention during a line interval;

FIG. 3 illustrates the analog videotelephone signal of known type for the duration of a picture;

FIG. 4 shows an analog videotelephone signal mixed with digital data channels integrated in the line and field blanking and synchronizing signals and transmitted by said video composite transmission system;

FIG. 7 is a schematic block diagram of the receiving part of said composite transmission system; and FIG. 8 shows the signals for controlling in writing-in and reading-out the memories of the transmission and receiving parts.

DESCRIPTION OF THE PREFERRED EMBODIMENT

Figure 5:
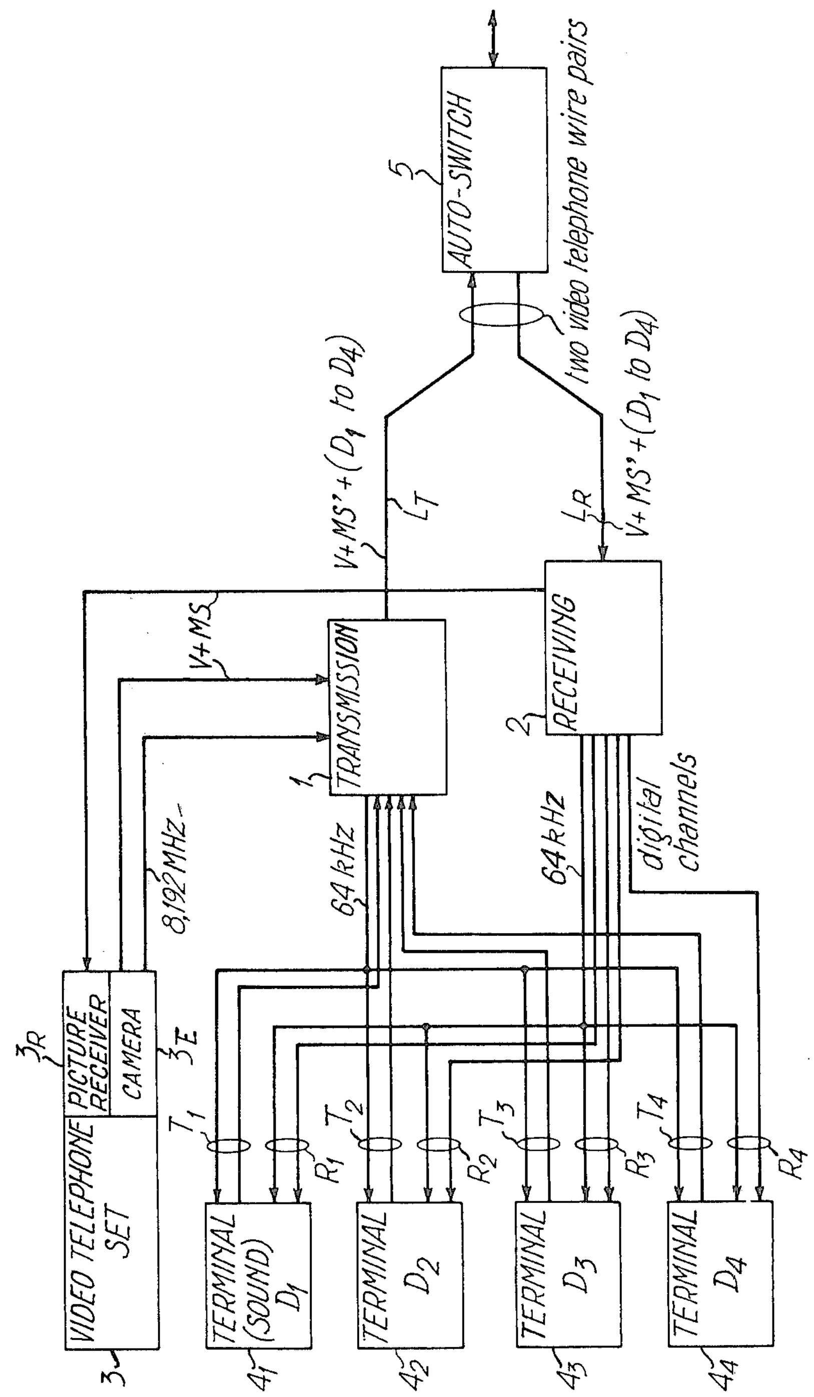
FIG. 5 is a schematic block diagram illustrating a videotelephone installation including said composite transmission system embodying the invention and digital data terminals.

The following is a description of a composite transmission system embodying the invention suitable for integrating three multiplexed digital data channels $D_1$, $D_2$ and $D_3$ at the binary rate of 64 kbits per second, into the horizontal blanking and synchronizing signal, and for integrating a digital data channel $D_4$ at the binary rate of 64 kbits per second, into the field blanking and synchronizing signal. The system is interconnected into a videotelephone installation which has been authorized by the French Posts and Telecommunications Administration and whose operating characteristics are as follows:

- picture definition: 267 lines of 250 points each, 16 black lines ($8+7+2\times0.5$) of which are available;
- horizontal scanning frequency of the line synchronizing signal: 8 kHz;
- vertical scanning frequency of the field (or half-trame or half-picture) synchronizing signal: 60 Hz, i.e. 30 pictures per second with interlace 2/1;
- definition of an odd field or half-frame: 134 lines, 8 black lines of which are available in the odd field blanking interval;
- definition of an even field or half-frame: 133 lines, 7.5 black lines of which are available in the even field blanking interval.

The system transmits and receives the video signal mixed with digital data channels through a pair of two-wires videotelephone cables having a bandwidth of about 1 MHz of known type used for analog videotelephone transmissions connected to a video switching network.

Before describing in detail the layout and organization of the system, the shape of the line and field blanking and synchronizing signals will be discussed so as to enable the structure and operation of the transmission and receiving parts of the system to be better understood.

FIG. 1 illustrates an analog video signal of known type mixed with the horizontal blanking and synchronizing signal HS having intervals equal to 19.53 μs, as shown in continuous line. The videotelephone video signal lies between the blanking or black level of 0.3 volt and the white level of 1 volt, and occupies the line trace intervals of 105.47 μs. The horizontal blanking interval includes a zero volt synchronizing pulse of 8.79 μs duration. This horizontal synchronizing pulse is preceded by a constant-voltage front porch, of 0.3 volts, enabling the start of a line to be detected for 2.93 μs, and is followed by another constant-voltage porch referred to as the back blanking porch, this latter-mentioned porch having a value of 0.3 V and enabling the d.c. component of the analog video signal to be realized, at the black level, for 7.81 μs.

The three digital data channels $D_1$, $D_2$ and $D_3$ have, according to this embodiment, been integrated in the horizontal blanking interval, as shown in FIG. 2. The line scanning frequency being of 8 kHz, 8 bits of a digital channel have to be integrated during each horizontal blanking interval in dependence on the bandwith of 1 MHz of the videotelephone transmission line. Consequently, one bit of digital information can at best be transmitted during 1 μs, and the total of the 3 multiplexed digital data signals $D_1$, $D_2$ and $D_3$ have to be so integrated that, firstly, a zero-volt horizontal synchronizing pulse will be present which is of sufficient pulse width to enable the line synchronization to be detected and, secondly, that the back line blanking porch of 0.3 V has sufficient duration to enable the d.c. component of the analog video signal to be reset. In accordance with the above-stated criteria a horizontal synchronizing pulse of zero volt shortened to 1.5 μs has been selected in this embodiment. Consequently, there remains at the most 15.1 μs to insert the 24 bits of the three digital data channels $D_1$, $D_2$ and $D_3$, that is to say an interval lower than 24 μs required for transmitting the digital information compatible with the analog videotelephone transmission line. In order to resolve the problem, the 8 successive bits of a digital channel are grouped, two by two, prior to transmission and, in accordance with this embodiment, are converted into an analog level in accordance with an analog 4-level code (M=4) equally distributed between the black and white levels, i.e. between 0.3 and 1 V. Consequently, the octet of a digital data channel occupies 4 μs in the blanking interval of a line and has a digital rate equal to 2.048 Megabits per second. As shown in FIG. 2, the whole of the digital information $D_1$, $D_2$ and $D_3$ occupies an interval of 12 μs preceded by a small porch of 0.50 μs at 0.3 V after the shortened horizontal synchronizing pulse, whose duration is 1.50 μs and which characterizes the new horizontal blanking and synchronizing signal HS' and is followed by an adequate porch at the black level of duration 2.60 μs.

Clearly, these three digital data channels are integrated during all the line blanking intervals, that is to say also in those associated with the available black lines of the field blanking and synchronizing signals, as will be made clear below.

FIG. 3 shows a known videotelephone signal constituted by the analog video signal V mixed with the line or horizontal and field or vertical blanking and synchronizing signal $MS=HS+VS=HS+FS_1+FS_2$ of a picture. As has already been stated, a picture is represented by two half-pictures or fields, which have double line interlace. The lines of a picture have been numbered from 1 through 267 starting with the odd field $F_1$ (134 lines numbered from 1 through 134) and ending with the even field $F_2$ (133 lines numbered from 135 through 267), the start of each line being delimited by the rise flank of its zero-volt synchronizing pulse.

The blanking and synchronizing signal $FS_1$ of an odd field comprises the first 8 lines of which the first line (number 1) has a characteristic zero-volt synchronization pulse during 96.68 μs, while the blanking and synchronizing signal $FS_2$ of an even field comprises the 8 lines numbered from 135 through 142 of which the 135th line has a characteristic zero-volt synchronizing pulse during 34.18 μs, as shown in dashed line in FIG. 1. It will be observed that lines No. 134 and 142 transmit half each, at the start and at the end respectively, the analog video signal V and, substantially half each, the black level at 0.3 volt. The other lines numbered 2 through 8 and 136 through 141 are similar to those described above with reference to FIG. 1, in which the line trace interval of 105.47 μs is constituted by a constant-voltage signal of 0.3 volt.

In accordance with this embodiment, only a digital data channel $D_4$ at the binary rate of 64 kbits/s is solely integrated in the field blanking and synchronizing signals. As already been stipulated, 8 bits of a digital channel of this kind have to be integrated in one line. Consequently, 1072 bits (134×8) and 1065 bits (133×8) are respectively allocated to the odd fields $F_1$ and even fields $F_2$. In order to obtain zero-volt synchronizing pulses in lines No. 1 and 135, which are sufficiently wide for the synchronization and differential detection of the fields, and bits of the digital data channel $D_4$ have been integrated in the trace intervals of the following lines at the rate of 170 bits in each of lines Nos. 2 through 7 and 52 bits in line No. 8 of an odd field $F_1$ and at the rate of 170 bits in each of lines Nos. 136 through 141 and 44 bits in the first half of line No. 142 of an even field $F_2$. Two successive bits of channel $D_4$ are grouped two by two, and as has already been stated, in an analog 4-level code, each level digit having a duration of 1 μs. Thus a group of 170 bits occupies an interval of 85 μs in the trace interval of an available black line.

As shown in the last two lines of FIG. 8, these groups of bits are preceded, for example, by an interval of 32-(12+0.5+1.5)=18 μs and bits of digital channels $D_1$, $D_2$ and $D_2$ in the blanking and synchronizing signal of the lines concerned, while, in the odd and even field synchronizing line proper Nos. 1 and 135, characteristic synchronizing pulses of width 82.68 μs and 20.18 μs, shown in lines composed of short dashes in FIG. 2, enable the new odd field blanking and synchronizing signal $FS_1'$ and the new even field blanking and sychronizing signal $FS_2'$ to be detected in the reception part. The new composite videotelephone signal $V+MS'+(D_1$ to $D_4)$ comprising the new mixed blanking and synchronizing signal $MS'=HS'+FS_1'+FS_2'$ which is illustrated in FIG. 4.

Attention is now directed to FIG. 5 which shows the local loop between the subscriber's premises and a local central office. The subscriber's premises includes the video composite transmission system embodying the invention comprising a transmission part 1 and a receiving part 2.

The transmission part 1 receives—from the picture emitter $3_E$ of a subscriber's videotelephone set 3, comprising a camera—the videotelephone video signal V mixed with the line and field blanking and synchronizing signal MS and an 8.192 MHz clock signal. This clock signal controls a time base 10 (see FIG. 6), which permits the synchronization of all the operations which have to be effected for integrating the digital data channels and shaping the new mixed blanking and synchronizing signal MS'. According to this embodiment of the invention, all the digital data terminals $4_1$ through $4_4$ in the subscriber's premises transmit digital data channels $D_1$ through $D_4$ at a rate of 64 kbits/s on the respective transmission paths $T_1$ through $T_4$ which are synchronized by a timing signal at 64 kHz transmitted by the transmission part 1 and processed from the clock signal of 8.192 MHz. The videotelephone video signal V, the new mixed blanking and synchronizing signal MS', the three digital data channels $D_1$ through $D_3$ multiplexed in the blanking intervals of all the lines and the digital data channel $D_4$ which has solely been integrated in the field blanking and synchronizing signal; transmitted in code at 4 analog levels, are mixed in analog waveform and are transmitted on a videotelephone line $L_T$ having a pair of balanced wires, towards the videotelephone autoswitch 5 of the local central office. This autoswitch 5 will transmit the digital and videotelephonic information to another subscriber connected to a system embodying the invention.

With this in view, the receiving part 2 carries out operations which are the reverse of those of the transmitting part 1. The receiving part 2 receives the composite signal $V+MS'+(D_1$ to $D_4)$ by another videotelephone line $L_R$ having a pair of balanced wires and a bandwidth which is equal to or greater than 1 MHz, similar to the transmission line $L_T$. The receiving part 2 supplies by means of a time base 20 comprising a phase loop (see FIG. 7), the timing frequencies required for reconstituting the mixed blanking and synchronizing signal MS and for decoding the data channels $D_1$ through $D_4$ transmitted in analog waveform. The reconstituted digital data channels are transmitted, synchronously at the rate of 64 kHz restored by the time base 20, towards the data terminals $4_1$ through $4_4$, the data of these terminals proceeding from the transmission part of the system of the other subscriber by way of reception paths $R_1$ to $R_4$. The video signal V and the reconstituted mixed blanking and synchronizing signal MS are transmitted towards the picture receiver $3_R$ of the videotelephone set 3.

A description will now be given of the transmission part 1 of a system embodying the invention whose received videotelephonic and analog signals are similar to those previously described with reference to FIGS. 1 and 3.

Figure 6:
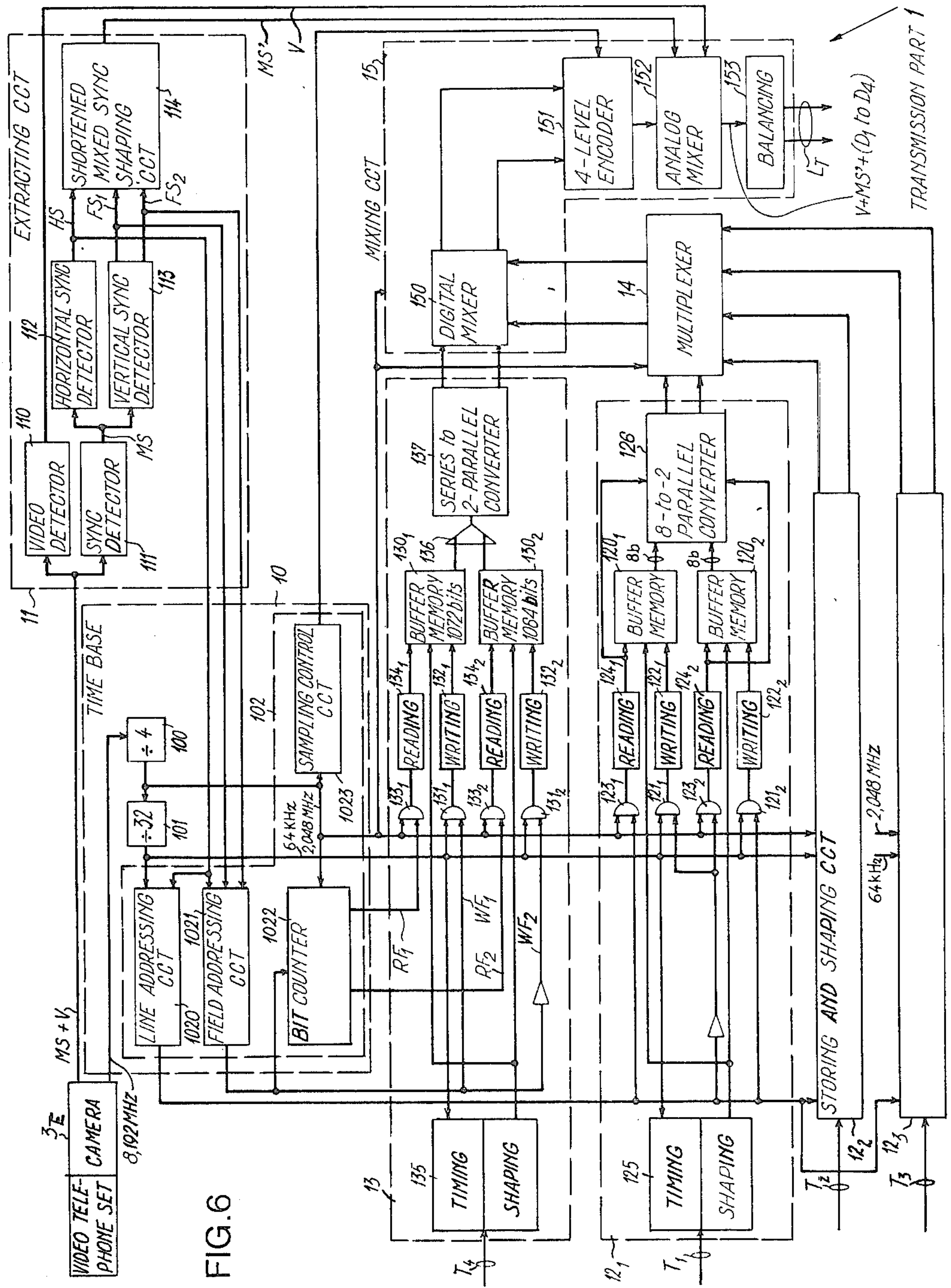
FIG. 6 is a schematic block diagram of the transmission part of said composite transmission system.

As shown in FIG. 6, the transmission part 1 essentially comprises the time base 10 receiving the 8.192 MHz clock signal from the picture emitter $3_E$ of the videotelephone set 3, an extracting circuit 11 extracting the horizontal blanking and synchronizing signal of lines HS and the vertical blanking and synchronizing signal $VS=FS_1+FS_2$ of the odd fields $F_1$ and even fields $F_2$ and for shaping the new mixed blanking and synchronizing signal MS' received at the same time as the video signal V, three circuits $12_1$, $12_2$, $12_3$ for storing and shaping, by pairs of bits, the digital data channels $D_1$, $D_2$, $D_3$ synchronously transmitted by the digital transmission paths $T_1$, $T_2$, $T_3$, a circuit 13 for storing and shaping, by pairs of bits, the digital data channel $D_4$ transmitted by the digital transmission path $T_4$, a multiplexer 14 for multiplexing pairs of bits of companded channels $D_1$, $D_2$, $D_3$, a mixing circuit 15 for converting the companded digital channels $D_1$ through $D_4$ into an analog 4-level code, for mixing them with the video signal V and the new mixed blanking and synchronizing signal MS', and for transmitting the analog video composite signal $V+MS'+(D_1$ to $D_4)$ towards the videotelephonic autoswitch 5 through the analog balanced line $L_T$.

In the extracting circuit 11, a first path isolated the video signal V by means of an analog detector 110, comprising a delay line imposing a delay equal to the duration entailed in extracting and shaping the blanking and synchronization signals. A second path in the circuit 11 detects, firstly, the initial mixed blanking and synchronizing signal MS by means of a detector 111 and, secondly, the blanking and synchronizing signal HS comprising the horizontal synchronizing pulses of 8.79 μs and the vertical synchronizing signals $FS_1$ and $FS_2$ of the ood and even fields by means of two detectors 112 and 113, these signals comprising the characteristic synchronizing pulses of 96.68 μs and 34.18 μs respectively. The signals HS, $FS_1$ and $FS_2$ are transmitted, firstly, to the time base 10 for supplying the signals required for controlling the different operations of multiplexing and of shaping the data channels $D_1$ through $D_4$ and, secondly, to a circuit 114 serving to shape the new mixed blanking and synchronizing signal MS' composed of the new horizontal blanking and synchronizing signals HS' and field blanking and sychronizing signals $HS_1'$ and $HS_2'$, such as are described with reference to FIGS. 2 and 4.

The time base 10 supplies 2.048 MHz and 64 kHz timing signals by means of frequency dividers 100 and 101 which respectively divide by 4 and 32, from the 8.192 MHz clock signal transmitted by the videotelephone set 3. These two timing signals are transmitted to a logic circuit 102 intended to control the different operations, in particular the operations of writing-in and reading-out the memory blocks and registers of circuits $12_1$, $12_2$, $12_3$ and 13. The structure of this logic circuit 102 will be gradually described in the course of the following description.

The shaping, by pairs of bits, of a digital data channel to be integrated in the horizontal blanking intervals will be described solely by the layout of circuit $12_1$, which is detailed in FIG. 6 and which is similar to that of the two other circuits $12_2$ and $12_3$.

A storing and shaping circuit 12 associated with a digital data channel D, comprises two buffer memories $120_1$ and $120_2$ which alternately transmit eight bits in parallel during the successive horizontal blanking intervals of 19.53 μs duration, that is to say when one of these memories is being read the other is being written.

With this in view, the logic circuit 102 comprises an addressing circuit 1020 intended to simultaneously control, during 125 μs, the writing-in of eight bits in series in the memory $120_1$ at the rate of 64 kHz via an AND-gate $121_1$ and a write-in circuit $122_1$, and during 12 μs, the reading-out of four groups of two parallel bits, at the rate of 2.048 MHz, which are supplied from the memory $120_2$ via an AND-gate $123_2$ and a read-out circuit $124_2$.

In complementary fashion, the addressing circuit 1020 simultaneously controls for the following line, during 125 μs, the writing-in of the following 8 bits in series at the rate of 64 kHz in the memory $120_2$ via an AND-gate $121_2$ and a write-in circuit $122_2$, and during 12 μs, the reading-out of four groups of two parallel bits, previously recorded in the memory $120_1$, at the rate of 2.048 MHz, via an AND-gate $123_1$ and a read-out circuit $124_1$. However, the reading controls are transmitted to a 8-to-2 parallel converter 126 which alternately receives the eight parallel bits from the two buffer memories $120_1$ and $120_2$ and transmits to the multiplexer 14 the successive pairs of parallel bits at the rate of 2.048 MHz.

The inputs of the buffer memories 120 of the circuit 12 and, as will be described below, of the buffer memories 130 in circuit 13, are of course respectively connected to the circuits 125 and 135 serving to transmit the timing signal at 64 kHz towards the digital data terminals 4 and shape the data channels into binary code by means of, for example, a transcoder which received the data according to a predetermined line code.

The storing and shaping circuit 13 associated with the digital data channel $D_4$ at 64 kbits/s to be integrated in the field blanking and synchronizing signals, that is to say in the trace intervals of the available field black lines Nos. 2 through 8 and Nos. 136 through 142 comprise in a manner analogous to the circuit 12, two buffer memories $130_1$ and $130_2$ which operate in phase opposition both for writing-in and reading-out during the periods of successive fields. The buffer memory $130_1$ is allocated to the odd fields $F_1$ and comprises 1072 binary stages, whereas memory $130_2$ is allocated to the even fields $F_2$ and comprises 1064 binary stages.

A circuit 1021 of the logic circuit 102 for addressing one field out of two supplies, from the horizontal and vertical blanking and synchronizing signals HS, $FS_1$, $FS_2$ transmitted by the detectors 112 and 113, two logic signals $WF_1$ and $WF_2$ intended to control the writing-in of memories $130_1$ and $130_2$ analogously to the signals supplied from the line addressing circuit 1020. The signals $WF_1$ and $WF_2$ are represented in the two first lines of FIG. 8. However, as the bit integration is different in the even and odd field blanking and synchronizing signals $FS_1$, $FS_2$ (44 and 52 bits in lines Nos. 8 and 142), a bit interval counter 1022 which produces two reading-out signals $RF_1$ and $RF_2$ for controlling the reading-out of the memories $130_1$ and $130_2$ and composed of six pulses of 85 μs and one pulse of 26 μs and of 22 μs respectively, is required for suitably integrating the bits of the digital data channels $D_4$. These signals $RF_1$ and $RF_2$ are represented in the two last lines of FIG. 8.

When the addressing circuit 1021 detects an even field synchronizing pulse of duration 34.18 μs, the circuit 1021 delivers signal $WF_1$ as soon as the synchronizing pulse of the following line No. 136 is recognized. The signal $WF_1$ feeds an AND-gate $131_1$ and a write-in circuit $132_1$ controlling the writing-in of 1072 bits in series of the digital channel $D_4$ at the rate of 64 kHz into the memory $130_1$ and, simultaneously, triggers the counter 1022 which transmits the signal $RF_2$ for reading-out 1064 bits in series at the rate of 2048 MHz, from the memory $130_2$ via an AND-gate $133_2$ and a read-in circuit $134_2$. In complementary fashion, when the 96.68 μs vertical synchronizing pulse of the following odd field is detected, the circuit 1021 delivers the signal $WF_2$ as soon as the synchronizing pulse of the following line No. 2 is recognized. Signal $WF_2$ feeds an AND-gate $131_2$ and a write-in circuit $132_2$ for writing-in 1064 bits in series, of the digital data channel $D_4$ at a rate of 64 kHz into the memory $130_2$; simultaneously, the counter 1022 transmits the signal $RF_1$ for writing-out the 1072 bits in series at the rate of 2048 MHz, into the memory $130_1$ via an AND-gate $133_1$ and a read-out circuit $134_1$, these 1072 bits having been previously recorded in the memory $130_1$.

The companded bits of groups of digital train $D_4$ transmitted, in series, at the rate of 2048 MHz by the buffer memories $130_1$ and $130_2$ are distributed over two parallel paths by way of an OR-gate 136 and a series-to-2 parallel converter 137. The multiplexer 14 and the converter 137 transmit the pairs of companded parallel bits of the multiplexed data channels $D_1$, $D_2$, $D_3$ during 12 μs of each line blanking interval and the pairs of companded paralled bits of the data channel $D_4$ during each field blanking interval (85 μs, 26 μs or 22 μs) to a digital mixer 150 of the mixing circuit 15.

In the mixing circuit 15, a 4-level encoder 151 converts each pair of parallel bits of each data channel into a digit having a level out-of-4 in accordance with this embodiment under control of a sampling control circuit 1023 inserted in the logic circuit 102. The analog signal of 1024 MHz of the corresponding quantized digits is then mixed, in an analog mixer 152, with the new mixed blanking and synchronizing signal MS' and with the video signal V transmitted by the circuit 114 and the detector 110, respectively. The analog video composite signal V+MS'+($D_1$ to $D_4$) at the output of the analog mixer 152 is then suitably balanced by a balancing unit 153 which routes the analog composite videotelephone signal comprising the data information, towards the videotelephone autoswitch 5 by way of the transmission line $L_T$.

A description will now be given of the receiving part 2 of the system according to the invention, this receiving part 2 being illustrated in FIG. 7.

This receiving part 2 essentially comprises a separating circuit 21 for separating the analog components of the composite videotelephone signal V+MS'+($D_1$ to $D_4$ transmitted by the autoswitch 5 along the balanced line $L_R$, an extracting circuit 22 for extracting and reconstituting the initial mixed blanking and synchronizing signal MS, a demultiplexer 23 for demultiplexing the pairs of bits of the three data channels $D_1$, $D_2$, $D_3$, three identical circuits $24_1$, $24_2$, $24_3$ for storing and reshaping digital channels $D_1$, $D_2$, $D_3$ at the rate of 64 kbits per second, a circuit 25 for storing and reshaping the digital data channels $D_4$, and the time base 20 serving to supply the timing and controlling signals in synchronism with the blanking and synchronizing signals HS', $FS_1'$ and $FS_2'$.

In the separating circuit 21 an unbalancing unit 210 suitably transmits the analog composite videotelephone signal V+MS'+($D_1$ to $D_4$), sent from the autoswitch 5, to a clamping circuit 211 which clamps the composite videotelephonic signal at the 0.3 volt black reference level. Thus, the composite analog signal passing through the autoswitch or autoswitches and the balancing and unbalancing units has undergone amplification and, consequently, its amplitude is only proportional to the amplitude of the analog composite signal transmitted by the transmission part 1 of the other subscriber. The analog composite signal is then separated into two paths by way of an analog separator 212, one of these paths comprising the extracting circuit 22 and the other path being constituted, at its input, by a 4-level decoder 213.

The extracting circuit 22 detects the video signal V by means of a detector 220, which comprises a delay line suitable for delaying the analog video signal V for the period required for reconstituting the initial mixed blanking and synchronizing signal MS, and the mixed blanking and synchronizing signal MS' by means of a detector 221. The horizontal blanking and synchronizing signal HS' and the vertical blanking and synchronizing signals $FS_1'$, $FS_2'$ shown in FIG. 2 are separated by means of detectors 223 and 224 respectively, and are transmitted to the time base 20 and to a circuit 222 which reconstitutes the initial mixed blanking and synchronizing signal MS similar to that shown in FIG. 1. A mixer 225 then supplies the videotelephone signal V+MS transmitted towards the picture receiver $3_R$ of the subscriber's videotelephone set 3.

The time base 20 of the receiving part 2 supplies synchronously with the line synchronizing pulses, shortened to 1.5 $\mu$s, of the detected horizontal blanking and synchronizing signal HS', a 4.096 MHz clock signal by means of a voltage controlled oscillator 201 controlled by a quartz locked at the frequency of 4,096 MHz. Two frequency dividers 202 and 203 by 2 and 32 respectively, which are connected in series to the output of the oscillator 201, process the two 2.048 MHz and 64 kHz timing signals required for controlling the reading-in and writing-out of the memory blocks of the storing and reshaping circuits 24 and 25, and for processing the control signals generated by a logic control circuit 204 described in the following paragraphs.

Returning now to the description of the separating circuit 21, each quantized digit of the analog signal of the data $D_1$ through $D_4$ is converted to one pair of companded parallel bits out-of-4 in the 4-level decoder 213 under control of a sampling control circuit 2040 of the logic circuit 204. The digital train ($D_1$ to $D_4$) of two parallel bits, proceeding from the decoder 213 at the rate of 2.048 Mbits/s, is distributed by means of a digital separator 214 to two digital trains of two parallel bits. A first train is transmitted towards the circuit 25 and corresponds to the digital data channel $D_4$ during the trace intervals substantially smaller than $125-32=93$ $\mu$s of the available black lines of the vertical blanking and synchronizing signals $FS_1'$ and $FS_2'$. A second train is transmitted towards the demultiplexer 23 and corresponds to the multiplexed digital data channels $D_1$, $D_2$ and $D_3$ during 12 $\mu$s included in the horizontal blanking and synchronizing intervals of signal HS' (See FIG. 4).

The demultiplexer 23 transmits successively along $3\times2$ parallel paths respectively and at the rate of 2.048 MHz, the pairs of companded bits of the channels $D_1$, $D_2$ and $D_3$ to the buffer memories of the storing and reshaping circuits $\mathbf{24_1}$, $\mathbf{24_2}$ and $\mathbf{24_3}$. As these three circuits are identical, only circuit $\mathbf{24_1}$ is shown in detail in FIG. 7 and will be described below.

Contrary to circuits 12 of the transmission part 1, the writing-in and reading-out of the memories of circuits 24 are carried out at the rate of 2.048 MHz and 64 kHz respectively, so as to suitably reshape the transmitted digital data. The circuit 24 has two parallel paths each of which successively transmits, at the frequency of 2.048 MHz, the four pairs of bits which are respectively assigned to two successive lines transmitted by the demultiplexer 23.

With this in view, a circuit 24 comprises two buffer memories $\mathbf{240_1}$ and $\mathbf{240_2}$ which respectively transmit, in parallel, the two groups of 8 bits or the two octets assigned to two successive lines, to two parallel-to-series converters $\mathbf{241_1}$ and $\mathbf{241_2}$, and the logic circuit 204 comprises a circuit 2041 for addressing one line out of successive two. The addressing circuit 2041 simultaneously controls via an AND-gate $\mathbf{242_1}$ and a write-in circuit $\mathbf{243_1}$, the writing-in of the four pairs of parallel bits transmitted in series during 12 $\mu$s by the demultiplexer 23 to the buffer memory $\mathbf{240_1}$ and, via an AND-gate $\mathbf{244_2}$ and a read-out circuit $\mathbf{245_2}$, the reading-out of 8 bits leaving the converter $\mathbf{241_2}$ in series during 125 $\mu$s. In complementary fashion, during the following line interval, the controlling signal of the addressing circuit 2041 are inverted. Simultaneously, the four following pairs of bits assigned to the digital data channel D are written into the buffer memory $\mathbf{240_2}$ via an AND-gate $\mathbf{242_2}$ and a write-in circuit $\mathbf{243_2}$ during 12 $\mu$s, and the four pairs of bits previously stored in the memory $\mathbf{240_1}$ are read in series at the output of the converter $\mathbf{241_1}$ via an AND-gate $\mathbf{244_1}$ and a read-out circuit $\mathbf{245_1}$ during 125 $\mu$s. The reading-out and writing-in operations are carried out at the frequency, viz 64 kHz and 2048 MHz respectively, of the timing signals transmitted to the AND-gates $\mathbf{244_1}$, $\mathbf{244_2}$, $\mathbf{242_1}$ and $\mathbf{242_2}$ by the frequency dividers 203 and 202.

The corresponding digital data channel D is thus reshaped at the output of an OR-gate 246 connected to the outputs of the converters $\mathbf{241_1}$ and $\mathbf{241_2}$, and is then transmitted to a shaping circuit 247 which, conveniently, transmits the digital channel along the receiving path R of the associated data terminal 4, as well as the 64 kHz timing signal.

The storing and reshaping circuit 25 allocated to the digital data channel $D_4$ comprises two buffer memories $\mathbf{250_1}$ and $\mathbf{250_2}$ of 1072 and 1064 binary stages respectively, which receive, in series and at the rate of 2.048 MHz, the bits transmitted in series by the digital separator 214 via a parallel-to-series converter 255. The memory part is similar to that of the circuit 13 of the transmission part 1.

With this in view, the logic circuit 204 comprises an addressing circuit 2042 which addresses one field out of interlaced 2 and supplies reading-out control signals $RF_1'$ and $RF_2'$ which are analogous to writing-in control signals $WF_1$ and $WF_2$, and a bit interval counter 2043 which supplies writing-in control signals $WF_1'$ and $WF_2'$ which are analogous to the reading-out control signals $RF_1$ and $RF_2$ shown in FIG. 8. When the shortened odd field synchronizing pulse of 82.68 $\mu$s has been detected, signal $WF_1'$ controls, at the rate of 2.048 MHz, the writing-in of 1072 companded bits of the channel $D_4$ into the memory $\mathbf{250_1}$ via an AND-gate 251 and a write-in circuit $\mathbf{252_1}$ and, simultaneously, signal $RF_2'$ controls, at the rate of 64 kHz, the reading-out of preceding 1064 bits of the channel $D_4$ in the memory $\mathbf{250_2}$ via an AND-gate $\mathbf{253_2}$ and a read-out control circuit $\mathbf{254_2}$. In complementary fashion, when the shortened even field synchronizing pulse of 20.18 $\mu$s has been detected, signal $WF_2'$ controls the writing-in of 1064 companded bits, at the frequency of 2.048 MHz, into memory $\mathbf{250_2}$ via an AND-gate $\mathbf{251_2}$ and a write-in control circuit $\mathbf{252_2}$ and, simultaneously, controls the reading-out of 1072 bits which have been previously memorized, at the rate of 64 kHz into memory $\mathbf{250_1}$ via an AND-gate $\mathbf{253_1}$ and a read-out control circuit $\mathbf{254_1}$.

A shaping circuit 257 transmits, analogously to the circuit 247 and by way of an OR-gate 256, the reshaped digital data channel $D_4$ and the 64 kHz timing signal on the receiving path $R_4$ of data terminal $\mathbf{4_4}$.

Although the invention has been described with reference to an embodiment relating to the integration of four digital data channels at 64 kbits/s into the line and field blanking and synchronizing signals of a videotelephonic signal, any other video analogue transmission system, which integrates synchronous digital data channels at different binary rates, can easily be realized by those skilled in the art. Thus, for example, two 64 kbits/s time-division multiplexed digital data channels are analogous to one 128 kbits/s digital data channel, and a 64 kbits/s digital data channel is analogous to eight time-division multiplexed digital data channels at 8 kbits/s rate.

In general terms, the digital data channels are distributed into two groups on the basis of whether they are integrated into the horizontal blanking and synchronizing signal or into the vertical blanking and synchronizing signal. In this case, each group of storing and shaping or reshaping circuits contains pairs of buffer memories respectively allocated to the group digital channels and associates with a transmission multiplexer or with a receiving demultiplexer.

It is to be noted that the embodiment described above does not completely use the available black lines of the field blanking and synchronizing signals $FS_1$, $FS_2$ and that an amount of digital data information to be transmitted can be greater than that of a single 64 kbits/s digital data channel such as $D_4$. Moreover, and according to particular requirements, the "rate" of transmitted companded information can be greater than that employed in the above-described example by using a conversion code having a number of quantization levels greater than 4.

It is also to be noted that one of the 64 kbits/s digital data channels can be the sound signal transmitted from the microphone of the videotelephone set. In accordance with this embodiment, an analog-to-digital converter and a digital-to-analog converter are respectively inserted in the output of the two-path sound transmission channel connected to the microphone and the loudspeaker of the subscriber's videotelephone set. Thus, the videotelephone transmission system comprises solely two pairs of balanced wires assigned to the transmission and receiving paths.

What we claim is:

1. A video composite transmission system connecting a camera and a picture receiver of a picture transmitting device and a plurality of data terminals to a video switching network via an analog two-path line transmitting an analog video composite signal, comprising:

means for shortening synchronizing pulses of first analog synchronizing signals transmitting from said camera, and thereby obtaining second analog shortened synchronizing signals having back blanking porches greater than those of said first synchronizing signals;

means for integrating and companding each of first digital data channels transmitting from first data terminals solely into the back blanking porches of each recurrent line of said second shortened synchronizing signals:

means for extracting and reshaping said first digital data channels in response to said first digital companded data channels included in said second shortened synchronizing signals transmitted from said video switching network;

means for multiplexing and demultiplexing said first digital companded data channels into a first digital multiplex data channel;

means for reshaping said first analog synchronizing signals transmitted to said picture receiver in response to said shortened synchronizing pulses of said second analog synchronizing signals transmitted from said video switching network;

means for integrating and companding each of second digital data channels transmitting from second data terminals solely into the trace interval of each available black line of vertical blanking and synchronizing signal transmitted from said camera;

means for multiplexing and demultiplexing said second digital companded data channels into a second digital multiplex data channel;

means for digitally mixing said first and second digital multiplex data channels and thereby obtaining a digital mixed data channel;

means for converting said digital mixed data channel from binary code used in said data terminals into a mixed analog data channel in a $2^M$-level code, M being an integer greater than or equal to 2;

means for analogically mixing said analog mixed data channel, said second analog shortened synchronizing signals and said video signal transmitted from said camera, and thereby obtaining said analog video composite signal transmitted to said video switching network;

means for analogically separating said analog mixed data channel, said second analog shortened synchronizing signals and said video signal in response to said analog video composite signal transmitted from said video switching network;

means for converting said analog mixed data channel in said $2^M$-level code into said digital mixed data channel in binary code;

means for digitally separating said first and second digital multiplex data channels in response to said digital mixed data channel; and means for extracting and reshaping said second digital data channels in response to said second digital companded data channels issued from said demultiplexing means of said second digital multiplex data channel.

2. A video composite transmission system as claimed in claim 1, in which said integrating and companding means of each first digital data channel comprises two buffer memories in which said first digital data channel is written-in during the intervals of first and second lines respectively which are interlaced 2 to 1, and is read-out at most during the back blanking porches of said second and first lines of said second shortened and synchronizing signals respectively, and in which said extracting and reshaping means of each first digital data channel comprises two buffer memories in which said first corresponding digital companded data channel is written-in at most during the back blanking porches of said second and first lines of said second analog shortened synchronizing signal respectively and is read-out during the interval of said first and second lines respectively.

3. A video composite transmission system connecting a camera and a picture receiver of a picture transmitting device and a plurality of data terminals to a video switching network via an analog two-path line transmitting an analog video composite signal, comprising:

means for integrating and companding each of digital data channels transmitting from said data terminals solely into the trace interval of each available black line of vertical blanking and synchronizing signal transmitted from said camera;

means for multiplexing and demultiplexing said digital companded data channels into a digital multiplex data channel;

means for converting said digital multiplex data channel from binary code used in said data terminals into an analog data channel in a $2^M$-level code, M being an integer greater than or equal to 2;

means for analogically mixing said analog data channel, the analog synchronizing signals and the video signal transmitted from said camera, and thereby obtaining said analog video composite signal transmitted to said video switching network;

means for analogically separating said analog data channel, said analog synchronizing signals and said video signal in response to said analog video composite signal transmitted from said video switching network;

posite signal transmitted from said video switching network;

means for converting said analog data channel in said $2^M$-level code into said digital multiplex data channel in binary code; and means for extracting and reshaping said digital data channels in response to said digital companded data channels issued from said demultiplexing means of said digital multiplex data channel.

4. A video composite transmission system claimed in claim 1 or 3, in which said integrating and companding means of each of said digital data channels into the trace interval of each available black line of vertical blanking and synchronizing signal transmitted to said video switching network comprises two buffer memories in which said digital data channel is written-in during the odd field interval and the even field interval of each picture frame respectively, and is read-out at most during the trace intervals of black lines of said even and odd fields respectively, and in which said extracting and reshaping means of each digital data channel corresponding to a digital companded data channel integrated into the trace interval of each available black line of vertical blanking and synchronizing signal transmitted from said video switching network comprises two buffer memories in which said digital companded data channel is written-in at most during the trace intervals of black lines of said even and odd fields respectively, and is read-out during the odd field interval and the even field interval of each picture frame respectively.

* * * * *